United States Patent
Le Guelvouit et al.

(10) Patent No.: US 9,239,966 B2
(45) Date of Patent: Jan. 19, 2016

(54) METHOD AND DEVICE FOR WATERMARKING A SEQUENCE OF IMAGES, METHOD AND DEVICE FOR AUTHENTICATING A SEQUENCE OF WATERMARKED IMAGES AND CORRESPONDING COMPUTER PROGRAM

(71) Applicant: Orange, Paris (FR)

(72) Inventors: Gaetan Le Guelvouit, Thorigne-Fouillard (FR); Francois Daude, Rennes (FR)

(73) Assignee: Orange, Paris (FR)

( * ) Notice: Subject to any disclaimer, the term of this patent is extended or adjusted under 35 U.S.C. 154(b) by 106 days.

(21) Appl. No.: 14/229,044

(22) Filed: Mar. 28, 2014

(65) Prior Publication Data

US 2014/0294229 A1    Oct. 2, 2014

(30) Foreign Application Priority Data

Mar. 29, 2013    (FR) ..................................... 13 52900

(51) Int. Cl.
*G06K 9/00*    (2006.01)
*G06K 9/62*    (2006.01)
*G06T 1/00*    (2006.01)
*H04N 1/32*    (2006.01)

(52) U.S. Cl.
CPC ............ *G06K 9/6202* (2013.01); *G06T 1/0028* (2013.01); *G06T 1/0057* (2013.01); *G06T 1/0085* (2013.01); *H04N 1/32144* (2013.01)

(58) Field of Classification Search
CPC .. G06K 9/6202; G06T 1/0028; G06T 1/0057; G06T 1/0085; H04N 1/32144
See application file for complete search history.

(56) References Cited

U.S. PATENT DOCUMENTS

| | | | | |
|---|---|---|---|---|
| 6,209,094 B1 * | 3/2001 | Levine | .................... | G06T 1/005 375/E7.018 |
| 6,341,350 B1 * | 1/2002 | Miyahara | ................ | G06T 1/005 375/E7.089 |
| 6,577,745 B1 * | 6/2003 | Op De Beeck | ......... | G06T 1/005 381/73.1 |

(Continued)

FOREIGN PATENT DOCUMENTS

| | | |
|---|---|---|
| CN | 101527830 A | 9/2009 |
| EP | 1718060 A1 | 11/2006 |

OTHER PUBLICATIONS

French Search Report and Written Opinion dated Feb. 13, 2014 for corresponding French Patent Application No. 1352900, filed Mar. 29, 2013.

(Continued)

*Primary Examiner* — Tom Y Lu
(74) *Attorney, Agent, or Firm* — David D. Brush; Westman, Champlin & Koehler, P.A.

(57) ABSTRACT

A method for watermarking a sequence of images is provided. The method implements the following steps, for at least one current image: comparing the current image with a preceding image of the sequence, delivering a difference image representing a motion between the preceding image and the current image; if the difference between the current image and the preceding image is above a predetermined threshold, watermarking the current image by inserting a message comprising a field carrying an identifier of the current image and a field carrying a soft hash obtained from at least one portion of the difference image; and if not, watermarking the current image by inserting a message comprising a field carrying an identifier of the current image.

16 Claims, 2 Drawing Sheets

(56) References Cited

U.S. PATENT DOCUMENTS

| | | | | |
|---|---|---|---|---|
| 6,823,455 | B1* | 11/2004 | Macy | G06T 1/005 380/38 |
| 6,870,931 | B2* | 3/2005 | Jones | G06T 1/0071 380/219 |
| 6,915,000 | B1* | 7/2005 | Tanaka | G06T 1/0028 382/100 |
| 6,971,012 | B1* | 11/2005 | Shimizu | G06T 1/005 358/1.18 |
| 7,206,430 | B2* | 4/2007 | Pelly | G06T 1/005 380/44 |
| 8,848,970 | B2* | 9/2014 | Aller | H04M 1/72522 345/632 |
| 2007/0071282 | A1 | 3/2007 | Isogai | |
| 2008/0089552 | A1 | 4/2008 | Nakamura et al. | |

OTHER PUBLICATIONS

Joachim J. Eggers et al., "Scalar Costa Scheme for Information Embedding", IEEE Transactions on Signal Processing, vol. 51, No. 4, Apr. 2003, pp. 1003-1019.

M. L. Miller et al., "Dirty-Paper Trellis Codes for Watermarking", IEEE International Conference on Image Processing, Rochester, NY, Sep. 2002).

F. Lefebvre et al., "A Robust Soft Hash Algorithm for Digital Image Signature", Image Processing, 2003. ICIP 2003.

Gaetan Le Guelvouit, "Tatouage robuste d'images par Turbo TCQ", Traitement du Signal, vol. 25, No. 6, Apr. 2009.

Gaetan Le Guelvouit, "Robust Image Watermarking by Turbo TCQ", Signal Processing, vol. 25, No. 6, Apr. 2009.

* cited by examiner

METHOD AND DEVICE FOR WATERMARKING A SEQUENCE OF IMAGES, METHOD AND DEVICE FOR AUTHENTICATING A SEQUENCE OF WATERMARKED IMAGES AND CORRESPONDING COMPUTER PROGRAM

1. FIELD OF THE INVENTION

The field of the invention is that of the securing of video data.

More specifically, the invention pertains to a technique for watermarking a sequence of images and a technique for authenticating a corresponding sequence of watermarked images, enabling the verification of the authenticity of such a sequence.

The invention can be applied in all fields requiring the certification of authenticity (i.e. the origin and/or integrity) of a sequence of images such as the distribution of video contents or the securing of videos from surveillance cameras.

2. PRIOR ART

Various techniques have already been proposed to prove the authenticity of a multimedia document.

For example, in cryptography, the authenticity of a document is ensured by the use of a hash or a MAC (Message Authentication Code).

According to the technique of cryptographic hashing, a condensate (a hash) of the original document to be secured is generated. If the original document is modified, even by only one bit, the condensate or hash is also modified. It is therefore possible to know if the original document has been modified.

One drawback of this technique is that it lacks flexibility. Thus, a "permitted" modification of the original document, such as a compression before transmission, modifies the hash of the document, which means that the document can no longer be authenticated. In addition, this technique cannot be used to identify the type of modifications undergone by the document.

Another technique classically used to prove the authenticity of a document is that of watermarking. Such a technique conceals information in the original document by modifying or distorting this document. The message to be concealed by watermarking is a set of bits or symbols, the content of which depends on the application. It may be the name or an identifier of the creator, an identifier of the original document, a signature describing the original document, etc.

Robust watermarking is the best known application of the techniques for concealing information: it is sought to insert an invisible message robustly within a multimedia document. Such watermarking is robust to compression, in the sense that a message inserted into an original document by such a watermarking technique is still readable after compression of the original document.

There also exist fragile or semi-fragile watermarking techniques. These techniques are varyingly sensitive to the modifications of the marked document.

One drawback of these techniques lies in the difficulty of successfully making the compromise between sensitivity towards "non-authorized" modifications (for example the retouching of an image) and robustness to compression. In practice, it is not possible to precisely determine whether a badly read watermark is the result of a retouching or an excessively heavy compression.

Furthermore, such techniques are not optimized for the securing of video type documents.

There is therefore a need for a novel technique to prove the authenticity of a multimedia document, especially suited to video type documents.

3. SUMMARY OF THE INVENTION

The invention proposes a novel solution that does not have all these drawbacks of the prior art in the form of a method for watermarking a sequence of images.

According to the invention, such a method implements the following steps for at least one current image of the sequence that is distinct from the first image of the sequence:
  comparing the current image with a preceding image of the sequence, delivering a difference image representing a motion between the preceding image and the current image;
  if the difference between the current image and the preceding image is above a predetermined threshold, watermarking the current image by inserting a message comprising a field carrying an identifier of the current image and a field carrying a soft hash obtained from at least one portion of the difference image (first watermarking mode);
  if not, watermarking of the current image by inserting a message comprising a field carrying an identifier of the current image (second watermarking mode).

The invention thus proposes a novel technique for watermarking a sequence of images, also called video, enabling the selection of a mode of watermarking among two modes of watermarking available for the different images of the sequence.

Thus, if there is little change between two successive images of the sequence of images, the message inserted into the second image comprises the identifier of the second image. By contrast, if there are differences between the two successive images of the sequence of images, the message inserted into the second image comprises the identifier of the second image and a soft condensate/hash of at least part of the second image.

It may be recalled that soft hashing (or perceptual hashing) is a technique inspired by cryptographic hashing (MD5, SHA-1, etc) to characterize multimedia data by a reduced signature.

The main characteristic of soft hashing is that it must be sensitive to the interpretable characteristics of the image (the salient points of an image for example, such as the contour of a face, the eyes, etc) but must be insensitive to the usual processing operations (change of contrast, luminosity, compression, etc). These characteristics are described especially in the document "*A robust soft hash algorithm for digital image signature*" by Fréderic Lefebvre.

Besides, according to a first example, two successive images of the sequence of images are considered to show no difference or little difference if less than 10% of the pixels differ between the two images. According to another example, the invention determines the average of the value of the pixels of the difference image and if this value is above a predetermined threshold, the differences between the two images are considered to be significant. According to yet another example, the average of the absolute values of the differences (for the totality of the image or for each zone of the image) is determined, and if this value is above a predetermined threshold (10 for example), there is considered to be a significant movement.

It is thus possible to certify the authenticity of the different images taken independently (since a message is inserted into each of these images). It is also possible to certify the authenticity between the images, and therefore the video, since the content of the message takes account of the motion between two images if there are substantial differences between these two images.

In particular, the technique of watermarking according to the invention enables the detection of whether some images have been retouched (i.e. transformed), duplicated or eliminated.

According to one particular characteristic of the invention, if the difference between the current image and the preceding image is above the predetermined threshold, the method for watermarking comprises a step for sub-dividing the difference image into at least two zones and a step for selecting the zone that has the greatest difference. In this case, the soft hash is obtained from the selected zone.

Thus, it is possible to reduce the length of the soft hash and therefore the size of the message to be inserted, and this makes it possible to preserve a watermark that is robust to compression. Indeed, the longer the message, the less robust is the watermarking to compression. In addition, the computation time is optimized by determining a hash/condensate on a smaller zone of the image.

In particular, the message comprises a field carrying an identifier of the selected zone.

According to another particular characteristic of the invention, the message also comprises an error-checking field.

Such a field bears for example a checksum and enables the detection of transmission errors and the limiting of false alarms.

According to one particular aspect of the invention, the error-checking field takes into account at least of one field carrying an identifier of the current image and of the field carrying a soft hash if the difference between the current image and the preceding image is above the predetermined threshold or, if not, it takes into account of the field carrying an image identifier.

In other words, the content of the checking field is defined in taking account of the content of the other fields of the message. This is for example a checksum implementing a computation of parity on all the bits of the fields preceding the checking field. These preceding fields comprise for example:

a field carrying an identifier of the current image, or a field carrying an identifier of the current image and a field carrying a soft hash obtained from the totality of the difference image, or a field carrying an identifier of the current image, a field carrying an identifier of the selected zone and a field carrying a soft hash obtained from the selected zone of the difference image.

According to another specific characteristic, the method of watermarking implements, for the first image of the sequence, a step of watermarking the first image with a message comprising an identifier of the image. The message used to watermark the first image optionally comprises a checking field.

According to one particular embodiment, the steps for watermarking implement a TCQ turbo type iterative error-correcting code.

Indeed, such a watermarking algorithm can easily be parameterized with regard to the number of bits of the message to be inserted.

In another embodiment, the invention pertains to a device for watermarking a sequence of images. Such a device comprises the following modules, activated for at least one current image of the sequence, distinct from the first image of the sequence:

a module for comparing the current image with a preceding image of the sequence, delivering a difference image representing a motion between the preceding image and the current image;

a watermarking module inserting, into the current image, a message comprising a field carrying an identifier of the current image and a field carrying a soft hash obtained from at least one portion of the difference image, if the difference between the current image and the preceding image is above a predetermined threshold and, if not, inserting a message comprising a field carrying an identifier of the current image.

Such a watermarking device is especially suited to implementing the method of watermarking described here above. It can for example be integrated into a transmitter or a video encoder, possibly with a system of video-surveillance.

This device could of course comprise the different characteristics of the method of watermarking according to the invention, which can be combined or taken in isolation. Thus, the characteristics and advantages of this device are the same as those of the watermarking method. They shall therefore not be described in more ample detail.

The invention also pertains to a method for authenticating a sequence of watermarked images intended to authenticate a sequence of images obtained by implementing the watermarking method described here above.

According to the invention, a method for authenticating of this kind implements the following steps for at least one current watermarked image of the sequence of watermarked images:

reading at least one part of a message preliminarily inserted into the current watermarked image;

determining a mode of watermarking used by the method for watermarking to watermark an original image corresponding to the current watermarked image, by analysis of the content of the part of the message so as to identify the field or fields forming the message;

authenticating or not authenticating the sequence of watermarked images.

Such a method is especially suited to authenticating a sequence of watermarked images by using the method described here above.

It can be used to certify the intra-image and inter-image authenticity of a sequence of images, also called video. In particular, it enables the detection of whether one or more images of the sequence have been modified, and makes it possible to identify the type of modification affecting the images of the sequence (eliminated, duplicated and/or retouched images).

According to one particular embodiment, the step for reading comprises the reading of a predetermined number of bits corresponding to the sum of the size of a field carrying an image identifier and the size of an error-checking field that are obtained for the current watermarked image, and the step for determining a watermarking mode implements a first sub-step for verifying the reading of the entirety of the message, based on the content of the error-checking field.

These first steps for reading and verifying make it possible to determine the watermarking mode used during the watermarking of the corresponding original image (i.e. the watermarking mode delivering a message comprising a field carrying an image identifier and a field carrying a soft hash according to a first mode of watermarking, or delivering a message comprising a field carrying an identifier of the current image according to a second mode of watermarking).

According to one particular characteristic, if the first sub-step for verifying the reading of the entirety of the message indicates that the entirety of the message has been read, the method for authenticating comprises a step for comparing the image identifier with an image identifier obtained for a preceding watermarked image of the sequence of watermarked images.

Such a comparison makes it possible especially to detect whether an image has been duplicated or eliminated.

According to another particular characteristic, if the image identifier obtained for the current watermarked image and the identifier obtained for the preceding watermarked image are successive, the method for authenticating comprises a step for comparing the current watermarked image and the preceding watermarked image, delivering a difference image representing a motion between the preceding watermarked image and the current watermarked image and the step for authenticating authenticates the current watermarked image if the difference between the current watermarked image and the preceding watermarked image is below the predetermined threshold.

Such a comparison makes it possible especially to detect whether an image has been retouched to insert an element. In particular, such a comparison is used to detect whether a motion has been erased.

According to another particular characteristic, if the first sub-step for verifying the reading of the entirety of the message indicates that the entirety of the message has not been read, the method for authenticating comprises:
  a step for reading a complementary number of bits of the message, corresponding to at least the size of a field carrying a soft hash obtained for the current watermarked image;
  a second sub-step for verifying the reading of the entirety of the message, based on the content of the error-checking field.

These second steps for reading and verifying make it possible to verify that the message comprises a field carrying an image identifier and a field carrying a soft hash. If such is not the case, it means that the image has deteriorated excessively or even that it has not been marked.

According to another particular characteristic, if the second sub-step for verifying the reading of the entirety of the message indicates that the entirety of the message has been read, the method for authenticating comprises a step for comparing the current watermarked image with a preceding watermarked image of the sequence of watermarked images, delivering a difference image representing a motion between the preceding watermarked image and the current watermarked image, and a step for determining the soft hash of at least one portion of the difference image. In this case, the step for authenticating authenticates the current watermarked image if the soft hash obtained during the step for determining corresponds to the content of the field carrying a soft hash of the message.

Such a comparison makes it possible especially to detect whether an image has been retouched, for example by replacing one face with another.

In particular, the method for authenticating comprises a step for sub-dividing the difference image into at least two zones, a step for selecting the zone having the greatest difference and a step for verifying that the selected zone corresponds to the content of a field carrying a zone identifier of the message. In this case, the soft hash is determined from the selected zone.

For this reason, a shorter hash is computed. This reduces the computation time and, at the watermarking level, preserves a watermarking that is robust to compression.

In another embodiment, the invention pertains to a device for authenticating a sequence of watermarked images intended to authenticate a sequence of images coming from the watermarking device described here above.

According to the invention, such a device comprises the following modules activated for at least one current watermarked image of the sequence of watermarked images:
  a module for reading at least one part of a message preliminarily inserted into the current watermarked image;
  a module for determining a mode of watermarking used by the watermarking device to watermark an original image corresponding to the current watermarked image, by analysis of the content of the part of the message, identifying the field or fields forming the message;
  a module for authenticating the sequence of watermarked images.

Such a device is especially suited to implementing the method for authenticating described here above. It is for example integrated into a receiver (for example of the set-top box type) or a video decoder.

In particular, it is suited to authenticating a sequence of watermarked images coming from the watermarking device described here above.

This device could of course comprise the different characteristics of the method for authenticating according to the invention, which can be combined or taken in isolation. Thus, the characteristics and advantages of the device are the same as those of the method for authenticating. They are therefore not described in more ample detail.

In yet another embodiment, the invention pertains to one or more computer programs comprising instructions to implement a method for watermarking and/or instructions to implement a method for authenticating as described here above, when this program or these programs are executed by a processor.

The methods according to the invention can therefore be implemented in various ways, especially in hardware form or in software form.

The invention also pertains to an information carrier that is readable by computer and comprises instructions of a computer program as mentioned here above.

4. LIST OF FIGURES

Other features and advantages of the invention shall appear more clearly from the following description of a particular embodiment, given by way of a simple illustratory and non-exhaustive example and from the appended drawings, of which:

FIG. 1 presents the main steps implemented by the technique for watermarking a sequence of images according to one particular embodiment of the invention;

Figure 5:
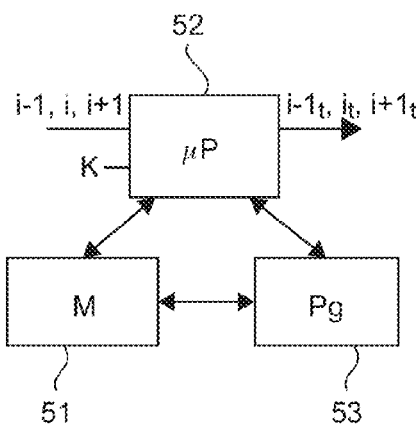
Figure 6:
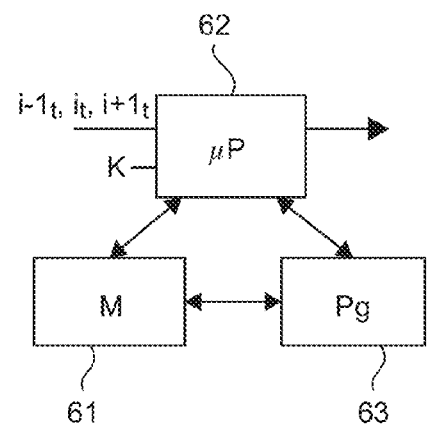

FIGS. 5 and 6 respectively illustrate the simplified structure of a device for watermarking implementing a technique for watermarking a sequence of images and a device for authenticating a sequence of images implementing a technique for authenticating according to one particular embodiment of the invention.

5. DESCRIPTION OF ONE EMBODIMENT OF THE INVENTION

5.1 General Principle

The general principle of the invention relies on the watermarking of a different message in the different images of a sequence of images, taking account especially of the motion between the successive images.

It is therefore possible to authenticate a received sequence of watermarked images in ascertaining that the received sequence contains no duplicated, retouched or eliminated images.

Figure 1:
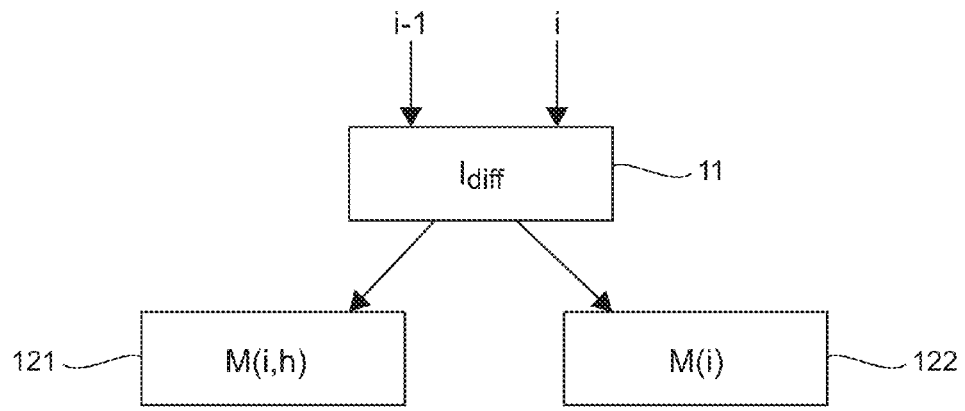

Referring to FIG. 1, we illustrate the main steps implemented for the watermarking of a sequence of images according to the invention.

Let's consider an image i of the sequence of images, called a current image, distinct from the first image of the sequence.

During a first step 11, the current image i is compared with a preceding image of the sequence, denoted as i−1. Thus, a difference image $I_{diff}$, is obtained, representing a motion between the preceding image i−1 and the current image i.

If there are significant differences between the current image i and the preceding image i−1, i.e. if the difference between the current image i and the preceding image i−1 is above a predetermined threshold, then a message M is inserted into the current image i during the step 121. Such a message comprises a field carrying an identifier of the current image and a field carrying a soft hash obtained from at least one portion of the difference image.

If not, i.e. if the difference between the current image i and the preceding image i−1 is smaller than or equal to a predetermined threshold, then a message M is inserted into the current image i during a step 122. Such a message comprises a field carrying an identifier of the current image.

For example, the average of the value of the pixels of the difference image is determined, and if this value is above a predetermined threshold, the differences between the current image i and the preceding image i−1 are considered to be significant. According to another example, the average of the absolute values of the differences (for the totality of the image or, if the image is sub-divided into zones, for each zone of the image) is determined. If the average of the absolute values is above a predetermined threshold, 10 for example, then there is deemed to be significant motion.

The message inserted into the different images of the sequence of images is therefore different from one image to another (since, in every case, it carries an identifier of the image), but is not independent image by image since it takes account of the motion appearing between two successive images when they have significant differences.

It can be noted that, since it is not possible to determine a difference image for the first image of the sequence, the first image is watermarked with a message comprising a field carrying an identifier of the first image (for example the index '0'). As the case may be, the image also comprises a checking field.

Figure 2:
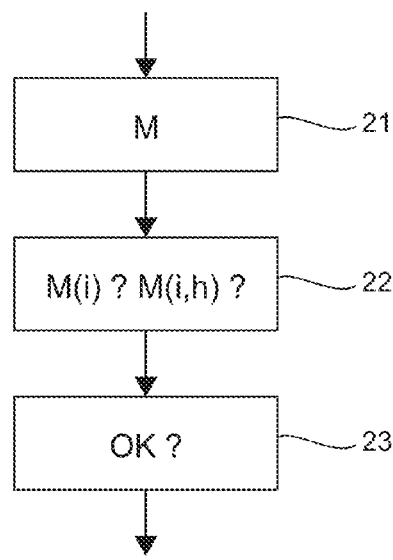
FIG. 2 shows the main steps implemented by the technique for authenticating a sequence of images according to one particular embodiment of the invention.

In order to verify the authenticity (i.e. the origin and/or integrity) of a sequence of watermarked images by using the technique presented here above, the following main steps illustrated in FIG. 2 are implemented.

An image $i_t$ of the sequence of watermarked images is considered. This image, called a current watermarked image, is supposed to correspond to the original current image i in which a message is inserted.

During a first step 21, at least a part of the message M preliminarily inserted into the current watermarked image $i_t$ is read.

During a second step 22, the mode of watermarking used to watermark an original image corresponding to the current watermarked image is determined by analyzing the content of the part of the message read so as to identify the field or fields forming the message. During this second step, it is sought to determine whether the message comprises a field carrying a hash, which would mean that there are significant differences between the current watermarked image $i_t$ and a preceding watermarked image $(i-1)_t$.

The analysis of the content of the message M makes it possible especially to decide, in a third step 23, whether or not the sequence of watermarked images is authentic (i.e. not falsified), and, as the case may be, which images of the sequence have been modified/eliminated/duplicated.

The invention thus makes it possible, in at least one embodiment, to certify the inter-image and intra-image authenticity of a sequence of images, whether or not it is compressed (with MPEG type encoding for example). In other words, it can be used to prove that a video was not modified, either in its structure (in the sequence of images that form it) or in its form, while at the same time remaining insensitive to compression. It makes it possible especially to detect whether images have been eliminated or duplicated and whether images have been retouched (for example by replacing one face by another).

5.2 Description of One Particular Embodiment

Here below, we present a particular embodiment of the invention in which the use of a robust technique for watermarking a current image, a soft hash and an error-detection system are combined to link the sequential images of the video.

Returning to the steps of FIG. 1, during the first step 11, the current image i is compared with a directly preceding image of the sequence, denoted as i−1. We thus obtain a difference image $I_{diff}$, representing a motion between the preceding image i−1 and the current image i.

In this particular embodiment, if there are no significant differences between the current image i and the preceding image i−1, the message to be watermarked in the current image comprises two fields, one carrying an identifier of the current image, encoded for example on A bits, and the other serving as a checking field, encoded for example on D bits.

Again according to this particular embodiment, if there are significant differences between the current image i and the preceding image i−1, the message to be watermarked in the current image comprises at least three fields, one carrying an identifier of the current image, encoded for example on A bits, another carrying a soft hash obtained from at least one portion of the difference image, encoded for example on C bits, and a last field serving as a checking field, encoded for example on D bits.

For example, the field carrying an identifier of the current image carries the number of the current image in the sequence of images. The checking field carries a checksum relating to the other fields of the message, such as a parity computation on all the preceding bits. Consequently, the checksum is determined once the preceding fields are completed. It is therefore determined either from the field carrying the identifier of the image only or from a concatenation of the field carrying the identifier of the image and the field carrying a soft hash. According to one variant described here below, the checksum can also be determined from a concatenation of the field carrying the identifier of the image, the field carrying a zone identifier and the field carrying a soft hash computed solely on this zone.

Classically, the hash function inputs an image, a key (optional) and delivers the hash in the form of a binary vector.

For example, it is considered that the hash function implemented in this particular embodiment implements a comparison of the average values of luminosity of random blocks. For example, the hash function delivers a bit equal to 1 if the luminosity of a current block is greater than that of a following block in the order of scanning of the blocks in an image. If not, it delivers a bit equal to 0. Naturally, other algorithms for determining the soft hash could be used such as the computation of a soft hash based on the differences between the DC coefficients of a block of the difference image considered.

For example, the field carrying a soft hash carries the soft hash obtained from the totality of the difference image.

According to one variant, the field carrying a soft hash carries the soft hash obtained from one portion only of the difference image. Indeed, it must be noted that the precision of detection of modification of the soft hash depends on its length: a longer hash is used to encode more characteristics of the image and therefore permits a finer detection if one of the characteristics of the image has been deteriorated. However, the longer the hash and therefore the longer the message to be inserted by watermarking, the less robust will be the watermark. Indeed, the robustness of the watermarking scheme depends on the number of bits of the message M. Thus, for a same distortion of insertion, a shorter message will be more robust.

Thus, in this variant, to limit the size of the hash while preserving high precision, it is assumed that two consecutive images of a video are very close to each other. The difference image obtained between these two consecutive images is therefore sub-divided into at least two zones, and the soft hash is computed solely on the most different zone, i.e. the zone in which there is the most motion. For example, the average of the absolute values of the differences for each zone is determined and the zone having the highest value is selected if this value is above a predetermined threshold (for example greater than 10).

Figures 3A, 3B, 3C:
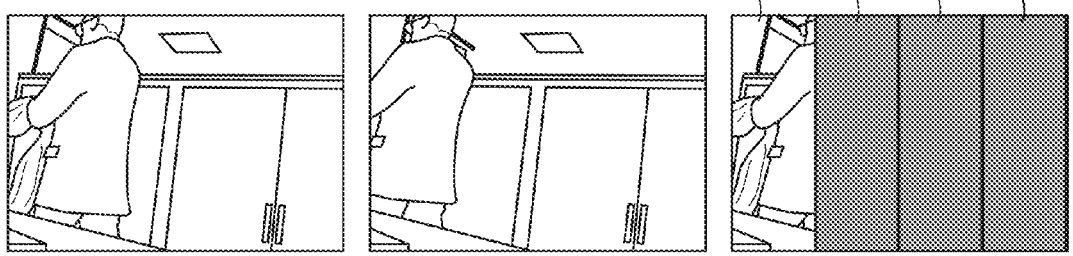
FIGS. 3A to 3C illustrate the building of a difference image and its segmentation into several zones.
Figure 4:
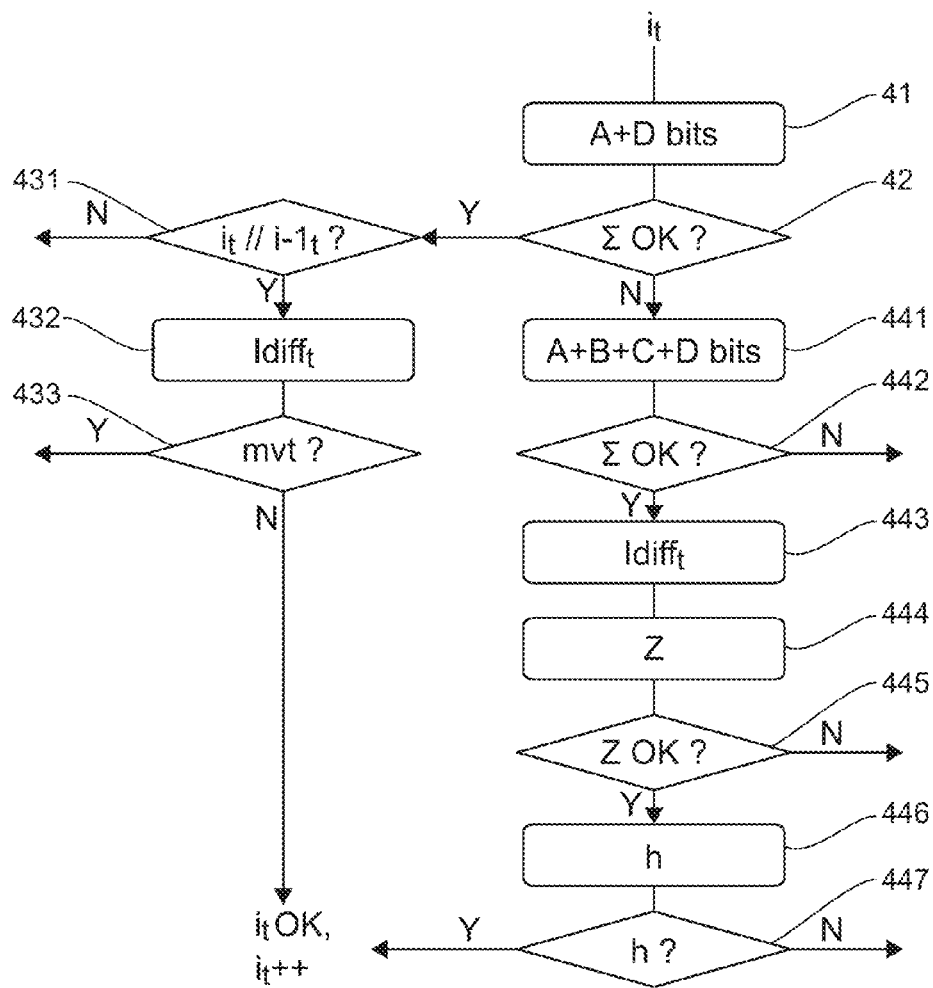
FIG. 4 is a flowchart of an example of implementation of the technique for authenticating according to FIG. 2.

This is especially illustrated in FIGS. 3A to 3C, respectively illustrating the preceding image i−1 of a video, the current image i of the video and a third image corresponding to the difference between the two sequential images i−1 and i. The third image is for example sub-divided into four zones Z1 to Z4 and it is the first zone Z1 that is identified as having the most motion. The soft hash is then computed solely on this first zone. It is thus possible to divide the size of the hash by 2, 4, 8 or more depending on the number of zones chosen.

In addition, according to this variant, the message to be watermarked in the current image comprises an additional field carrying an identifier of the selected zone, formed for example by B bits. For example, the field carrying an identifier of the selected zone carries the number of the selected zone.

The message thus built can then be inserted into the current image i, in using any robust image watermarking algorithm. The algorithm is for example an algorithm using a TCQ turbo type iterative error-correcting code and a spread transformation, all in the DCT (discrete cosine transform) domain of the image as described in the document G. Le Guelvouit, "Tatouage robuste d'images par turbo TCQ" (*Robust watermarking of images by turbo-type TCQ*), Signal Processing, Vol. 25, 6 Apr. 2009). According to another example, the watermarking algorithm can be a robust watermarking algorithm as described in the document "Dirty-paper trellis codes for watermarking", (M. L. Miller, G. J. Doërr and I. J. Cox., IEEE Int. Conf. on Image Processing, Rochester, N.Y., September 2002) or "Scalar Costa scheme for information embedding", (J. J. Eggers, R. Baüml, R. Tzchoppe and B. Girod., IEEE Trans. on Signal Processing, April 2003).

Such an algorithm inputs the current image to be watermarked i, a message M built as explained here above, a watermarking key k, possibly a distortion d, and delivers a watermarked or marked image $i_t$.

In short, according to this particular embodiment and if we consider the variant according to which the soft hash is computed solely on one portion of the image, the message to be watermarked will be formed by two or four fields:
an image identifier on A bits, and
a checking field on D bits to check the integrity of the message,
if there is no motion or little motion between the current image to be watermarked and the preceding image;
an image identifier on A bits,
a zone identifier on B bits,
a soft hash corresponding to this zone on C bits, and
a checking field on D bits to check the integrity of the message,
if there is a significant motion between the current image to be watermarked and the preceding image.

In other words, the fields carrying the zone number and the soft hash are optional: if there is no motion, it is unnecessary to watermark this part.

Again, inasmuch as it is not possible to determine the difference image for the first image of the sequence, the first image is watermarked according to this particular embodiment with a message comprising two fields: one carrying an identifier of the first image ("0" for example) on A bits and the other serving as a checking field (corresponding parity bit for example) on D bits.

The operations described here above can then be repeated to watermark the following images of the sequence of images. There are therefore two watermarking modes possible for each image of the sequence of images: on A+D bits when the motion between the current image and the preceding image is not significant, and on A(+B)+C+D=n bits if not.

Here below, we present the operations implemented to verify the authenticity of a sequence of watermarked images according to the particular embodiment described here above.

In particular, we consider the variant according to which the soft hash is computed solely on a portion of the image. The message inserted in the images of the sequence is therefore formed by two or four fields.

Returning to the steps of FIG. 2, during the first step 21, at least a part of the message preliminarily inserted into the current watermarked image $i_t$ is read. To this end, the mark present in the current watermarked image $i_t$ is read on a number of bits corresponding to the sum of the size of a field carrying an image identifier (A bits) and the size of a error checking field (D bits), where the mark corresponds to the differences between an original image and its watermarked version.

The checksum is then verified (42): if it is correct, it means that the message is encoded on (A+D) bits and that the entirety of the message has been read. If it is not corrected, it means that the message was encoded on (n=A+B+C+D) bits and that the entirety of the message has not been read.

If the checksum is correct, then the identifier received for the current image ($i_t$) is compared (431) with an image identifier obtained for a preceding watermarked image $(i-1)_t$ of the sequence of watermarked images.

If the result is not consistent, i.e. if the image numbers obtained are not successive, it means that some images have been duplicated or eliminated. For example, if the image identifier field associated with the current watermarked image carries number 5, while the image identifier field associated with the preceding watermarked image carries number 3, it means that image number 4 has been eliminated from the sequence of images. In the same way, if two successive watermarked images carry number 7, it means that the image has been duplicated.

If the result is consistent, i.e. if the image numbers obtained are successive, then the current watermarked image $(i_t)$ and the preceding watermarked image $(i-1)_t$, are compared so as to determine a difference image $Idiff_t$ representing a motion between the preceding watermarked image and the current watermarked image.

If there are significant differences (433), it means that the current watermarked image has been retouched to insert an element. Indeed, because of the watermarking algorithm used, a watermarking mode is used on A+D bits when the motion between the current image and the preceding image is not significant. If not, a watermarking mode is used on A(+B)+C+D=n bits. In this example, the watermarking mode used to watermark the corresponding original image i is on A+D bits, which means that there are no differences or few differences between the original image i and the preceding original image i−1. They should therefore be no differences or few differences between the current watermarked image $(i_t)$ and the preceding watermarked image $(i-1)_t$. The presence of a significant motion means that the elements have been modified inside the current watermarked image $(i_t)$.

By contrast, if there are no significant differences, the authenticity of the current watermarked image $(i_t)$ is proven and the same operations can be made for the next watermarked image $(i+1)_t$.

If, during the verification (42) of the checksum, it is noted that the checksum is not correct, then the mark present in the current watermarked image $i_t$ is read (441) on a number of bits corresponding to the sum of the size of a field carrying an image identifier (A bits), the size of a field carrying a zone identifier (B bits), the size of a field carrying a soft hash (C bits) and the size of an error-checking field (D bits).

The checksum is verified again (442): if it is correct, it means that the message is encoded on (A+B+C+D) bits, and that the entirety of the message has been read. If it is not correct, it means that the current watermarked image is excessively degraded or even contains no watermark.

If the checksum is correct, then the current watermarked image $i_t$ is compared (443) with a preceding watermarked image $(i-1)_t$ of the sequence of watermarked images so as to determine a difference image $Idiff_t$ representing a motion between the preceding watermarked image and the current watermarked image.

As in the particular embodiment considered, the soft hash is computed only on one portion of the image, then the zone of the difference image presenting the greatest amount of motion is selected (444) by using the same algorithm for sub-dividing into zones/selection as the one used during the watermarking of the sequence of images.

A verification is then made (445) on whether the selected zone corresponds to the content of the field carrying a zone identifier of the message (on B bits), for example by verifying that the number of the selected zone and the zone number carried by the field are identical. If this is not the case, it means that the current watermarked image has been retouched, for example by replacing the face of one person by another.

If the identifier of the selected zone is not consistent with the identifier contained in the field carrying a zone identifier, then the soft hash of the selected zone is determined (446).

A verification is then made (447) on whether the determined soft hash corresponds to the content of the field carrying a soft hash of the message (on C bits) for example by verifying that the determined soft hash and the soft hash carried by the field are identical or similar. If this is not the case, it means that the current watermarked image has been retouched.

If the determined soft hash is consistent with the soft hash contained in the field carrying a soft hash of the message, the authenticity of the current watermarked image $(i_t)$ is proven and the same operations can be performed as with the next watermarked image $(i+1)_t$.

In other words, the authentication is cascaded by verifying which length of message has been inserted through the checksum and verifying that the image identifier and soft hash are correct.

5.3 Variants Considered

In the embodiment described here above, a variant was considered in which the soft hash is not computed on the totality of the difference image but only on one zone of this image. When the soft hash is computed on the totality of the difference image, the operations implemented to verify the authenticity of a sequence of watermarked images are identical to those described here above. These operations are done in reading the mark on (A+C+D) bits during the step 441, and in omitting the step 444 and 445 for selecting a zone of the difference image having the greatest motion and for making a comparison with the content of the field carrying a zone identifier of the message.

Besides, in the embodiment described here above, we have considered the presence of a checking field. Such a checking field is optional even if it is preferable in order to detect the errors of transmission or to limit the number of false alarms. In one variant, this field could be replaced by an indicator indicating the watermarking mode used for the image or in other words the format of the message (such as the number of its fields).

5.4 Structure of the Watermarking and Authenticating Devices

Finally, referring to FIGS. 5 and 6 respectively, we present a simplified structure of a watermarking device implementing a technique for watermarking a sequence of images and the structure of an authentication device implementing a technique for authenticating a sequence of watermarked images according to one particular embodiment of the invention.

As illustrated in FIG. 5, such a watermarking device comprises a memory 51 comprising a buffer memory, a processor unit 52, equipped for example with a microprocessor μP, and driven by the computer program 53 implementing the watermarking method according to the invention.

At initialization, the code instructions of the computer program 53 are for example loaded into a RAM and then executed by the processor of the central processing unit 52. The central processing unit 52 inputs a sequence of images to be watermarked and a watermarking key K. The microprocessor of the processing unit 52 implements the steps of the watermarking method described here above, according to the instructions of the computer program 53 to generate a sequence of watermarked images. To this end, the watermarking device comprises, in addition to the buffer memory 51, a module for comparing the current image with a preceding image of the sequence, delivering a difference image representing a motion between the preceding image and the current image and a watermarking module inserting, in the current image, a message comprising a field carrying an identifier of the current image and a field carrying a soft hash obtained from at least one portion of the difference image if the difference between the current image and the preceding image is above a predetermined threshold, or a message corresponding to a field carrying an identifier of the current message if this is not the case.

These modules are driven by the microprocessor of the processing unit 52.

As illustrated in FIG. 6, such a device for authenticating a sequence of watermarked images for its part comprises a memory 61 comprising a buffer memory, a central processing unit 62, equipped for example with a microprocessor µP, and driven by the computer program 63 implementing the method for authenticating a sequence of watermarked images according to the invention.

At initialization, the code instructions of the computer program 63 are for example loaded into a memory RAM and then executed by the processor of the central processing unit 62. The central processing unit 62 inputs a sequence of watermarked images and the watermarking key K. The microprocessor of the central processing unit 62 implements the steps of the method for authenticating a sequence of watermarked images described here above, according to the instructions of the computer program 63 to read the messages associated with the different watermarked images of the sequence and to determine whether the processed sequence of images is authentic. To this end, the device for authenticating comprises, in addition to the buffer memory 61, a module for reading at least one part of a message preliminarily inserted in a current watermarked image, a module for determining a mode of watermarking used to watermark an original image corresponding to the current watermarked image, by analysis of the content of the part of the message used to identify the field or fields forming the message, and a module for authenticating the sequence of watermarked images.

These modules are driven by the microprocessor of the central processing unit 62.

The invention claimed is:

1. A method for watermarking a sequence of images, wherein said method implements the following steps, for at least one current image of said sequence that is distinct from a first image of said sequence:
   comparing said current image with a preceding image of said sequence, delivering a difference image representing a motion between said preceding image and said current image;
   if the difference between said current image and said preceding image is above a predetermined threshold, watermarking said current image by inserting a message comprising a field carrying an identifier of said current image and a field carrying a soft hash obtained from at least one portion of said difference image; and
   if not, watermarking said current image by inserting a message comprising a field carrying an identifier of said current image.

2. The method for watermarking a sequence of images according to claim 1, wherein, if the difference between said current image and said preceding image is above said predetermined threshold, it comprises a step of sub-dividing said difference image into at least two zones and a step of selecting the zone that has the greatest difference, and in that said soft hash is obtained from said selected zone.

3. The method for watermarking a sequence of images according to claim 2, wherein said message further comprises a field carrying an identifier of said selected zone.

4. The method for watermarking a sequence of images according to claim 1, wherein said message also comprises an error-checking field.

5. The method for watermarking a sequence of images according to claim 4, wherein said error-checking field takes into account at least of said field carrying an identifier of said current image and of said field carrying a soft hash if the difference between said current image and said preceding image is above said predetermined threshold or, if not, said error-checking field takes into account said field carrying an identifier of said image.

6. A device for watermarking a sequence of images wherein said device comprises the following modules, activated for at least one current image of said sequence, distinct from a first image of said sequence:
   a module configured to compare said current image with a preceding image of said sequence, delivering a difference image representing a motion between said preceding image and said current image; and
   a watermarking module configured to insert, into said current image, a message comprising a field carrying an identifier of said current image and a field carrying a soft hash obtained from at least one portion of said difference image, if the difference between said current image and said preceding image is above a predetermined threshold and, if not, inserting a message comprising a field carrying an identifier of said current image.

7. A method for authenticating a sequence of watermarked images,
   wherein said method for authenticating implements the following steps for at least one current watermarked image of said sequence of watermarked images:
      reading at least one part of a message preliminarily inserted into the current watermarked image;
      determining a mode of watermarking used to watermark an original current image corresponding to said current watermarked image, by analysis of content of said at least one part of the message so as to identify a field or fields forming said message, said field or fields carrying an identifier of said original current image and carrying a soft hash obtained from at least one portion of a difference image representing a motion between an original preceding image and said original current image, if the difference between said original current image and said original preceding image is above a predetermined threshold and, if not, said field or fields carrying the identifier of said original current image; and
      authenticating or not authenticating said sequence of watermarked images.

8. The method for authenticating according to claim 7, wherein said step of reading comprises the reading of a predetermined number of bits corresponding to the sum of the size of a field carrying an image identifier and the size of an error-checking field that are obtained for said current watermarked image, and in that said step of determining a watermarking mode implements a first sub-step for verifying the reading of the entirety of said message, based on the content of said error-checking field.

9. The method for authenticating according to claim 8, wherein, if said first sub-step of verifying the reading of the entirety of said message confirms that the entirety of the message has been read, said method for authenticating comprises a step of comparing said image identifier with an image identifier obtained for a preceding watermarked image of said sequence of watermarked images.

10. The method for authenticating according to claim 9, wherein, if said image identifier obtained for said current watermarked image and said identifier obtained for said preceding watermarked image are successive, said method for authenticating comprises a step of comparing said current watermarked image and said preceding watermarked image, delivering a difference image representing a motion between said preceding watermarked image and said current watermarked image and said step of authenticating authenticates said current watermarked image if the difference between said current watermarked image and said preceding watermarked image is below a predetermined threshold.

11. The method for authenticating according to claim 8, wherein, if said first sub-step of verifying the reading of the entirety of said message confirms that the entirety of said message has not been read, said method for authenticating comprises:
 a step of reading a complementary number of bits of said message, corresponding to at least the size of a field carrying a soft hash obtained for said current watermarked image; and
 a second sub-step of verifying the reading of the entirety of said message, based on the content of said error-checking field.

12. The method for authenticating according to claim 11, wherein, if said second sub-step of verifying the reading of the entirety of the message confirms that the entirety of said message has been read, said method for authenticating comprises a step of comparing said current watermarked image with a preceding watermarked image of said sequence of watermarked images, delivering a difference image representing a motion between said preceding watermarked image and said current watermarked image, and a step of determining a soft hash of at least one portion of said difference image,
 and said step of authenticating authenticates said current watermarked image if the soft hash obtained during said step of determining corresponds to the content of said field carrying a soft hash of said message.

13. The method for authenticating according to claim 12, wherein it comprises a step of sub-dividing said difference image into at least two zones, a step of selecting the zone having the greatest difference and a step of verifying that said selected zone corresponds to the content of a field carrying a zone identifier of said message,
 and said soft hash is determined from said zone selected in the event of positive verification.

14. A device for authenticating a sequence of watermarked images,
 wherein said device for authenticating comprises the following modules, activated for at least one current watermarked image of said sequence of watermarked images:
 a module configured to read at least one part of a message preliminarily inserted into said current watermarked image;
 a module configured to determine a mode of watermarking used by said watermarking device to watermark an original current image corresponding to the current watermarked image by analysis of the content of said at least one part of the message, identifying the field or fields forming said message, said field or fields carrying an identifier of said original current image and carrying a soft hash obtained from at least one portion of a difference image representing a motion between an original preceding image and said original current image, if the difference between said original current image and said original preceding image is above a predetermined threshold and, if not, said field or fields carrying the identifier of said original current image; and
 a module configured to authenticate said sequence of watermarked images.

15. A non-transitory computer readable memory comprising a computer program stored thereon and comprising instructions to implement steps of a method for watermarking a sequence of images, when this program is executed by a processor, wherein the method comprises:
 for at least one current image of said sequence that is distinct from a first image of said sequence:
 comparing said current image with a preceding image of said sequence, delivering a difference image representing a motion between said preceding image and said current image;
 if the difference between said current image and said preceding image is above a predetermined threshold, watermarking said current image by inserting a message comprising a field carrying an identifier of said current image and a field carrying a soft hash obtained from at least one portion of said difference image; and
 if not, watermarking said current image by inserting a message comprising a field carrying an identifier of said current image.

16. A non-transitory computer readable memory comprising a computer program stored thereon and comprising instructions to implement steps of a method for authenticating a sequence of watermarked images, when this program is executed by a processor, wherein the method comprises:
 for at least one current watermarked image of said sequence of watermarked images:
 reading at least one part of a message preliminarily inserted into the current watermarked image;
 determining a mode of watermarking used to watermark an original current image corresponding to said current watermarked image, by analysis of content of said at least one part of the message so as to identify a field or fields forming said message, said field or fields carrying an identifier of said original current image and carrying a soft hash obtained from at least one portion of a difference image representing a motion between an original preceding image and said original current image, if the difference between said original current image and said original preceding image is above a predetermined threshold and, if not, said field or fields carrying the identifier of said original current image; and
 authenticating or not authenticating said sequence of watermarked images.

\* \* \* \* \*